(12) United States Patent  
Saint-Cyr et al.

(10) Patent No.: US 12,241,417 B2  
(45) Date of Patent: Mar. 4, 2025

(54) COMBINED TCA COOLER AND FGH FOR POWER PLANTS

(71) Applicant: Mitsubishi Power Americas, Inc., Lake Mary, FL (US)

(72) Inventors: Jeanfils Saint-Cyr, Orlando, FL (US); Brady Adams, Maitland, FL (US); Anthony Bravato, Orlando, FL (US); Erwing Calleros, Oviedo, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 17/738,349

(22) Filed: May 6, 2022

(65) Prior Publication Data

US 2023/0358173 A1 Nov. 9, 2023

(51) Int. Cl.
*F02C 7/224* (2006.01)
*F02C 6/08* (2006.01)
*F02C 7/18* (2006.01)

(52) U.S. Cl.
CPC ............ *F02C 7/224* (2013.01); *F02C 6/08* (2013.01); *F02C 7/18* (2013.01); *F05D 2220/72* (2013.01); *F05D 2260/213* (2013.01); *F05D 2260/22141* (2013.01); *F05D 2260/232* (2013.01); *F05D 2260/606* (2013.01)

(58) Field of Classification Search
CPC .. F28D 1/0435; F28D 2021/0026; F28D 1/04; F02C 6/08; F02C 7/224; F02C 7/18; F01K 23/08; F01K 23/02; F01K 23/00; F01K 23/10; F05D 2220/72; F05D 2260/213; F05D 2260/22141; F05D 2260/232; F05D 2260/606
See application file for complete search history.

(56) References Cited

U.S. PATENT DOCUMENTS 5,794,448 A   8/1998  Fujioka et al.
9,925,845 B2 * 3/2018  Katoh ................ B60H 1/00342
(Continued)

OTHER PUBLICATIONS

Nerheim, Hydrogen as a Maritime Fuel-Can Experiences with LNG Be Transferred to Hydrogen Systems, 2021.*
(Continued)

*Primary Examiner* — Todd E Manahan
*Assistant Examiner* — Rodolphe Andre Chabreyrie
(74) *Attorney, Agent, or Firm* — Schwegman Lundberg & Woessner, P.A.

(57) ABSTRACT

A combined cycle power plant comprises a gas turbine engine comprising a compressor to produce compressed gas, a combustor to produce combustion gas from compressed gas and fuel, and a turbine to receive combustion gas to produce rotational shaft power; a steam system generates steam from water using the combustion gas exiting the turbine; a first stage fuel-gas heater receives the fuel before entering the combustor and receive feedwater from the steam system to transfer heat from the feedwater to the fuel; and a second stage fuel-gas heater receives at least a portion of the fuel from the first stage fuel-gas heater to transfer heat to the fuel from a heat transfer medium before the fuel enters the combustor. A method comprises operating a gas turbine engine, operating a steam cycle, extracting compressed air for cooling the gas turbine engine, and transferring heat to fuel from the compressed air.

16 Claims, 5 Drawing Sheets

(56) References Cited

U.S. PATENT DOCUMENTS

| | | | |
|---|---|---|---|
| 10,352,249 B2 | 7/2019 | Yamazaki et al. | |
| 10,900,422 B2* | 1/2021 | Logan | F28F 27/02 |
| 10,975,771 B2 | 4/2021 | Nakazawa et al. | |
| 10,989,117 B2* | 4/2021 | Roberge | F02C 3/22 |
| 11,125,166 B2 | 9/2021 | Nakazawa et al. | |
| 11,268,530 B2* | 3/2022 | Roberge | F04D 29/582 |
| 2019/0128184 A1* | 5/2019 | Kim | F02C 7/141 |
| 2021/0102492 A1* | 4/2021 | Rambo | F02C 3/22 |
| 2022/0316395 A1* | 10/2022 | Bak | F02C 7/224 |

OTHER PUBLICATIONS

Amiri, Boiling effects in heat exchangers, https://www.linkedin.com/pulse/boiling-effect-heat-exchangers-ghasemian-amiri-ceng-mimeche, 2016.*

* cited by examiner

COMBINED TCA COOLER AND FGH FOR POWER PLANTS

TECHNICAL FIELD

This document pertains generally, but not by way of limitation, to power cycles used in gas turbine combined cycle (GTCC) power plants. More specifically, but not by way of limitation, the present application relates to turbine cooling air (TCA) and fuel gas heater (FGA) systems for gas turbine engines used in GTCC power plants.

BACKGROUND

Gas turbine power generation equipment can generate electrical power by operating a gas turbine engine to drive an electrical generator. A gas turbine engine can comprise a compressor, a combustor, and a turbine. The compressor can generate high temperature, high pressure air by compressing air drawn into an air inlet. The combustor can generate high temperature, high pressure combustion gas by supplying fuel to the compressed air and causing the mixture to be combusted. The turbine can be configured with a plurality of turbine vanes and turbine blades disposed alternately in a turbine passage within a casing. The turbine blades can be driven with the combustion gas supplied to the turbine passage, thereby driving a turbine shaft connected to the turbine blades to rotate. The turbine shaft can be used to drive the compressor and electrical generator. The combustion gas that has driven the turbine can be released to the atmosphere as exhaust gas or used in other applications, such as a heat recovery steam generator (HRSG).

Conventionally, the gas turbine engine can be provided with a cooling air system that can extract bleed air from the compressor after or during compression ("bleed air") and supply the relatively cooler bleed air to the gas turbine engine to cool various parts thereof, such as turbine blades and the combustor.

Some gas turbines may utilize turbine cooling air coolers (TCA coolers), examples of which are described in U.S. Pat. No. 5,794,448 to Fujioka et al., titled "Gas turbine fuel heating apparatus" and U.S. Pat. No. 10,352,249 to Yamazaki et al., titled "Gas turbine power generation equipment, and device and method for drying gas turbine cooling air system."

Gas turbine engines may utilize a fuel gas heating system that receives fuel from a fuel source and adds heat to the fuel before the fuel is provided to the combustor, thereby improving the combustion efficiency of the gas turbine engine.

Examples of fuel gas heaters (FGHs) are described in U.S. Pat. No. 10,975,771 to Nakazawa et al., titled "Gas turbine combined cycle plant and method for controlling gas turbine combined cycle plant" and U.S. Pat. No. 11,125,166 to Nakazawa et al., titled "Control system, gas turbine, power generation plant, and method of controlling fuel temperature."

OVERVIEW

The present inventors have recognized, among other things, that improvements in power cycle performance can be obtained by improvements in operation of turbine cooling air coolers (TCA coolers) and fuel gas heaters (FGHs) within a gas turbine combined cycle (GTCC) power plant. For example, typical TCA coolers in GTCC power plants utilize feedwater from a heat recovery steam generator (HRSG) to cool compressed air used to cool other portions of the gas turbine engine. A typical FGH also utilizes feedwater extracted from the HRSG to heat fuel entering the combustor. Thus, for example, the efficiency of the power cycle can be reduced by the compressor of the gas turbine engine having to provide compressed air not used to rotate the turbine, and heat being removed from the HRSG to heat the fuel. Typically, TCA and FGH systems operate independently due to, for example, the differing temperatures at which they operate. For example, typical TCA coolers take high pressure feedwater from the steam cycle and return the water to the steam cycle at a very low pressure, which can require multiple control valves, piping and other equipment. The valves, piping and other equipment can increase the cost and complexity of the combined cycle power plant and introduce potential failure points. Additionally, fuel gas heaters can be limited in the temperatures to which they are able to heat the fuel due to, for example, the thermodynamic heat transfer capabilities of water used as the feedwater at the critical condition, e.g., ~375° C. and 220 atmospheres.

The present subject matter can help provide solutions to these problems and other problems, such as by using a combined Turbine Cooling Air cooler and Fuel Gas Heater heat exchanger. The combined TCA/FGH heat exchanger can be used to transfer heat from compressed air extracted from the compressor to the fuel, thereby reducing the burden on the HRSG. The fuel can be additionally heated with HRSG feedwater in a first-stage heat exchanger such that temperatures beyond the heating capability of water can be achieved. In examples, flows of the compressed air and fuel can be incorporated into a fin-fan radiator-type heat exchanger. One or more fans, as well as the amount of fuel to be heated by the HRSG feedwater, can be modulated to control heat transfer rates and the temperature of the fuel that reaches the combustor. Also, the feedwater used in the first-stage heat exchanger can be extracted from the HRSG at a lower temperature than conventional FGHs, thereby incurring less of a performance penalty at the HRSG.

In an example, a combined cycle power plant can comprise a gas turbine engine comprising a compressor configured to produce compressed gas, a combustor configured to produce combustion gas from the compressed gas and a fuel, and a turbine configured to receive the combustion gas to produce rotational shaft power; a steam system configured to generate steam from water using the combustion gas exiting the turbine; a first stage fuel-gas heater configured to receive the fuel before entering the combustor and receive feedwater from the steam system to transfer heat from the feedwater to the fuel; and a second stage fuel-gas heater configured to receive at least a portion of the fuel from the first stage fuel-gas heater to transfer heat to the fuel from a heat transfer medium before the fuel enters the combustor.

In another example, a method of heating fuel in a combined-cycle power plant can comprise operating a gas turbine engine to produce combustion gas from compressed air and a fuel, operating a steam cycle with heat from the combustion gas, extracting a portion of the compressed air for cooling a portion of the gas turbine engine, and transferring heat to the fuel for the gas turbine engine from the portion of the compressed air extracted from the gas turbine engine.

This overview is intended to provide an overview of subject matter of the present patent application. It is not intended to provide an exclusive or exhaustive explanation of the invention. The detailed description is included to provide further information about the present patent application.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
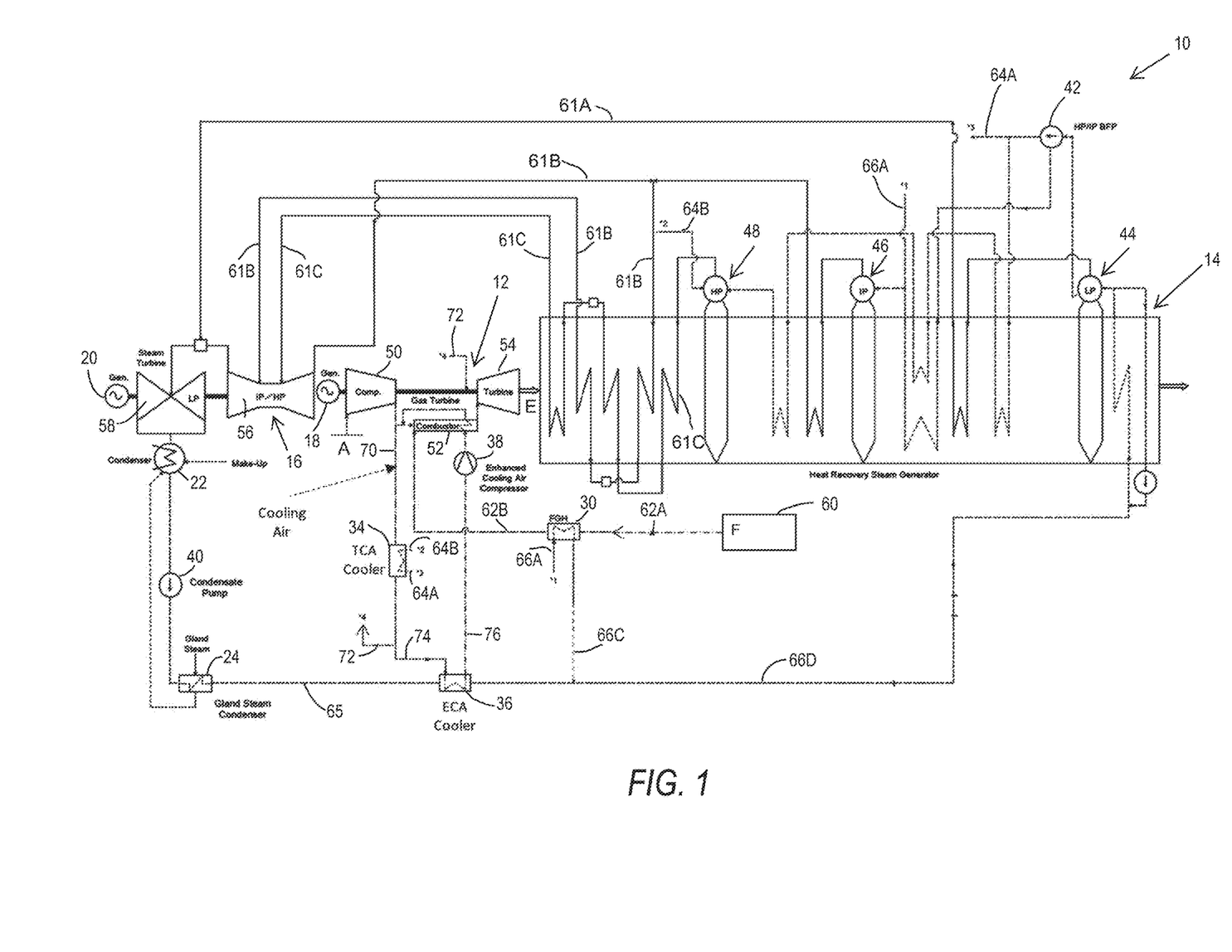
FIG. 1 is a schematic diagram illustrating a conventional Gas Turbine Combined Cycle (GTCC) power plant having a Turbine Cooling Air cooler and a Fuel Gas Heater operating independently from each other.

FIG. 1 is a schematic diagram illustrating conventional Gas Turbine Combined Cycle (GTCC) power plant 10 having gas turbine engine (GTE) 12, Heat Recovery Steam Generator (HRSG) 14 and steam turbine 16. GTE 12 can be used in conjunction with electrical generator 18, and steam turbine 16 can be used in conjunction with electrical generator 20. Power plant 10 can also include condenser 22 and gland steam condenser (GSC) 24, fuel gas heater (FGH) 30, Turbine Cooling Air (TCA) cooler 34, condensate pump 40 and feedwater pump 42. HRSG 14 can include low pressure section 44, intermediate pressure section 46 and high pressure section 48. Condenser 22 can form part of a cooling system and can comprise a surface condenser with cooling water. GTE 12 can include compressor 50, combustor 52 and turbine 54. Steam turbine 16 can include IP/HP spool 56 and LP spool 58.

TCA cooler 34 can utilize feedwater from HRSG 14 to cool compressed air extracted from compressor 50 ("bleed air") to cool portions of gas turbine engine 12, such as combustor 52 and turbine 54. In examples, the cooled bleed air can be provided to the inlet of combustor 52.

FGH 30 can utilize feedwater from HRSG 14 to heat fuel from fuel source 60 in order to increase the thermal efficiency of GTE 12. Fuel can flow from fuel source 60 to FGH 30 at line 62A, and from FGH 30 to combustor 52 at line 62B.

Ambient air can enter compressor 50 for compression. The compressed air can be fed to combustor 52 and mixed with fuel F from fuel source 60 (after being heated in fuel gas heater 30), which can be a source of natural gas or liquid fuel. The compressed air from compressor 50 can be mixed with the fuel for combustion in combustor 52 to produce high energy gas for turning turbine 54. Rotation of turbine 54 can be used to produce rotational shaft power to drive compressor 50 and electrical generator 18. Exhaust gas E can be directed to HRSG 14, where exhaust gas E can interact with appropriate water/steam piping in high pressure section 48, intermediate pressure section 46 and low pressure section 44 to produce steam. The steam can be routed to IP/HP spool 56 and LP spool 58 of steam turbine 16 via steam lines 61C, 61B and 61A to produce rotational shaft power to operate electrical generator 20. Exhaust gas E can exit HRSG 14 utilizing any appropriate venting means, such as a stack. HRSG 14 can additionally include appropriate means for conditioning exhaust gas E to remove potentially environmentally hazardous materials. For example, HRSG 14 can include a Selective Catalytic Reduction (SCR) emissions reduction unit and/or CO catalyst.

HRSG 14 working fluid, such as steam or water, can be used as a cooling source in TCA cooler 34 to cool the bleed air. Water from feedwater pump 42 can be supplied to TCA cooler 34 via line 64A, as is shown by arrows 3'-3', which can then be returned to high pressure section 48 via line 64B, as is shown by arrows 2'-2'. Water from HRSG 14 can also be used to perform fuel heating at fuel gas heater 30 with water line 66A, as is shown by arrows 1'-1', and water can then be returned to low pressure section 44 via lines 66C and 66D. Water flowing within HRSG 14 can generally be referred to as feedwater.

TCA cooler 34 can operate utilizing bleed air taken from compressor 50 at line 70. TCA cooler 34 can provide initial cooling using feedwater from high pressure section 48. The cooled bleed air can be fed to turbine 54 using line 72. The cooled bleed air can be used to cool vanes and blades of turbine 54, such as via impingement cooling or film cooling. Additionally, the bleed air can be consumed or partially consumed in the combustion process.

The extraction of bleed air at line 70 can reduce the overall efficiency of gas turbine engine 12 because energy is degraded (from compressed air at topping cycle to feedwater at bottoming cycle). Furthermore, performance of HRSG 14 can be degraded by the extraction of high-quality heat from intermediate pressure section 46 at 1'.

In the present disclosure, heat from compressed air extracted from compressor 50 can be transferred to fuel F, thereby reducing the need for extracting heat from intermediate pressure section 46 of HRSG 14. Furthermore, heat from compressed air extracted from compressor 50 and feedwater from intermediate pressure section 46 of HRSG 14 can cooperatively heat fuel F to achieve higher temperatures of fuel F to thereby further improve the combustion process.

Figure 2:
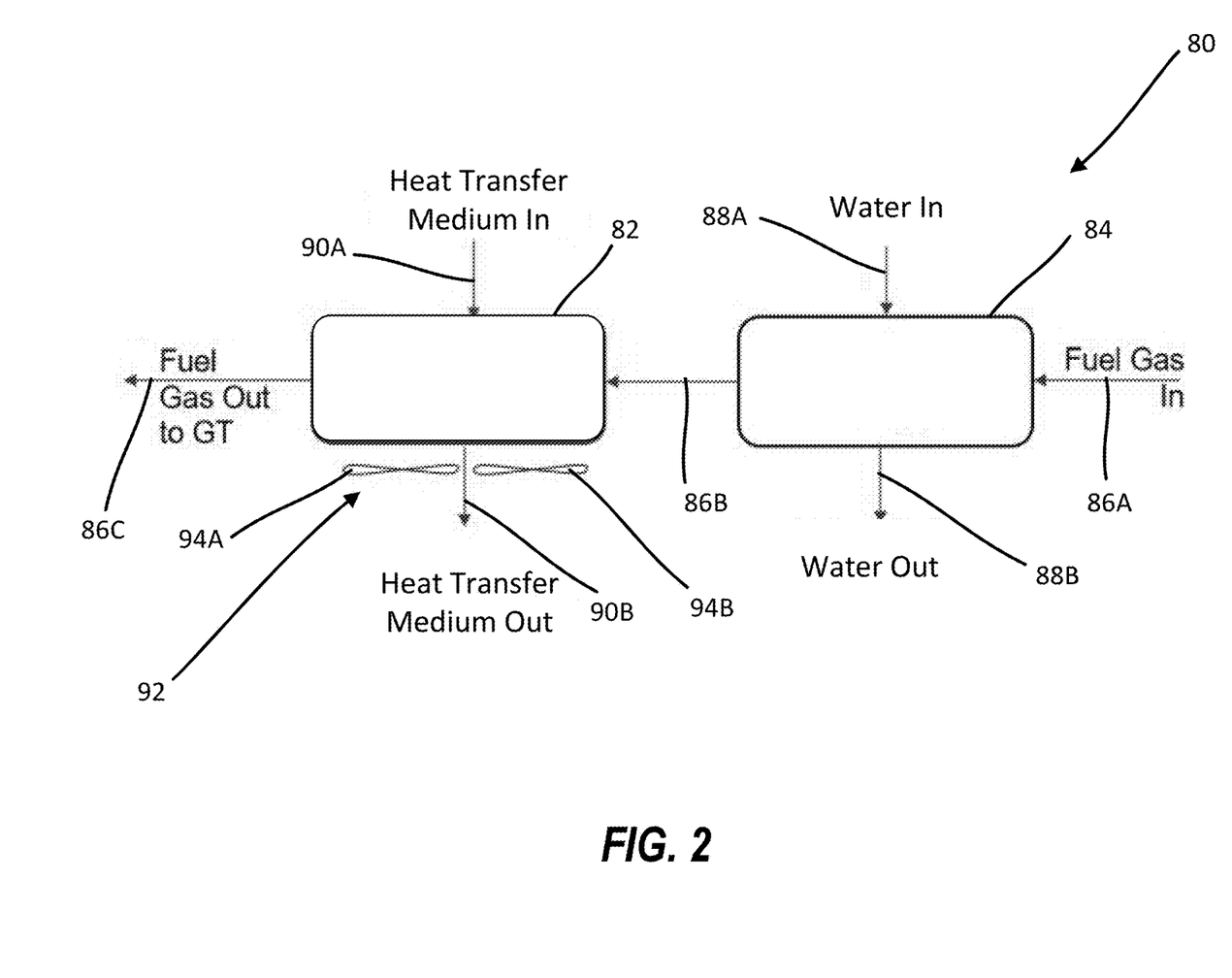
FIG. 2 is a schematic diagram illustrating a combined Turbine Cooling Air cooler and Fuel Gas Heater heat exchanger of the present disclosure.

FIG. 2 is a schematic diagram illustrating system 80 comprising combined heat exchanger 82 and first stage heat exchanger 84 of the present disclosure. Fuel can flow into system 80 at line 86A, between first stage heat exchanger 84 and combined heat exchanger 82 at line 86B and out of combined heat exchanger 82 at line 86C. A first heat transfer medium can flow into first stage heat exchanger 84 at line 88A and out of first stage heat exchanger 82 at line 88B. A second heat transfer medium can flow into combined heat exchanger 82 at line 90A and out of combined heat exchanger 82 at line 90B. Heat transfer system 92 can be positioned proximate to combined heat exchanger 82 and can comprise first fan 94A and second fan 94B.

Combined heat exchanger 82 can comprise a combination of a turbine cooling air cooler, such as TCA cooler 34 of FIG. 1, and a fuel gas heater, such as FGH 30 of FIG. 1.

However, rather than using a heat transfer medium from a steam cycle, combined heat exchanger 82 can utilize the heat from the compressed bleed air as the second heat transfer medium. In examples, combined heat exchanger 82 can replace TCA cooler 34 of FIG. 1 and can be interconnected with line 62B between FGH 30 and combustor 52.

Figure 3:
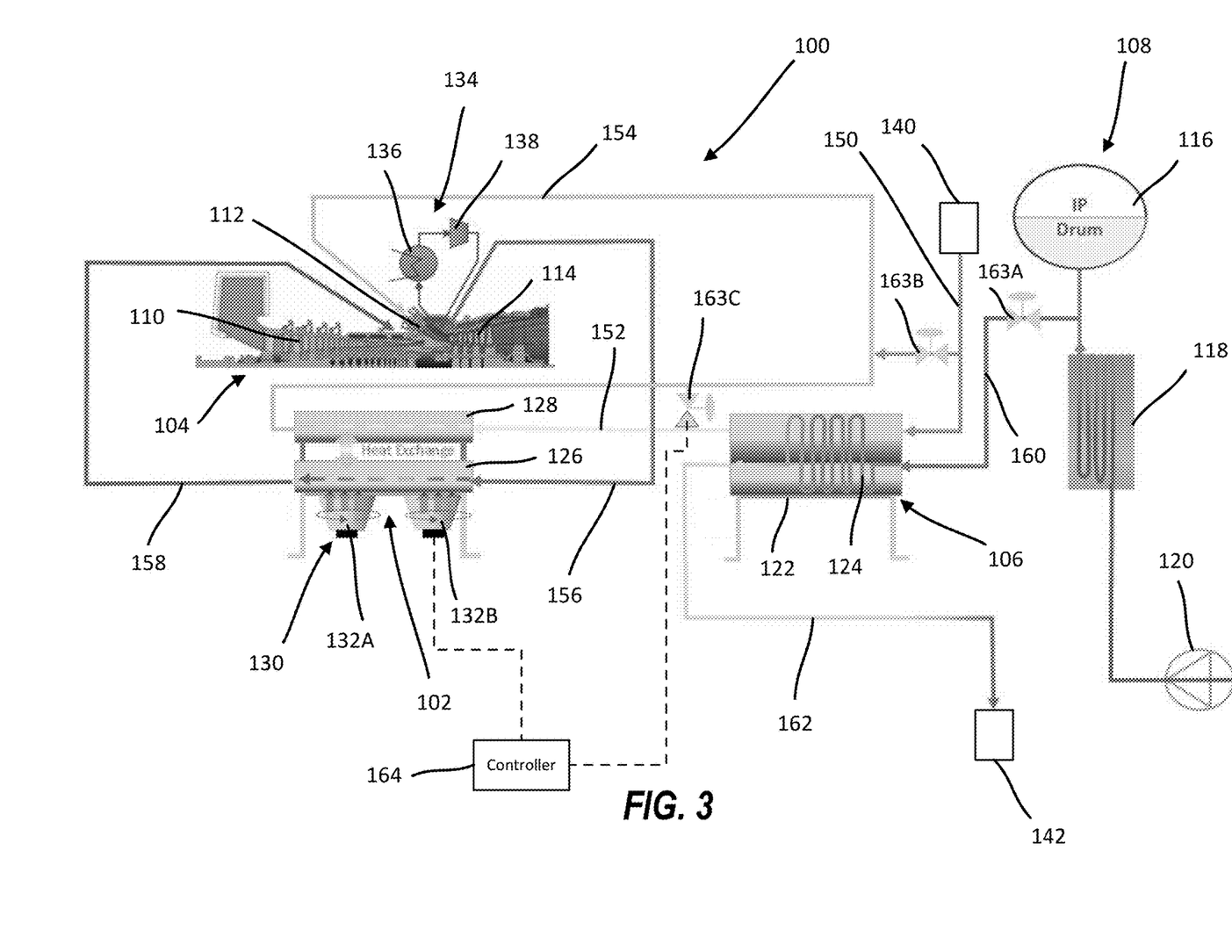
FIG. 3 is a schematic diagram illustrating a Gas Turbine Combined Cycle (GTCC) power plant of the present disclosure comprising a combined Turbine Cooling air cooler and Fuel Gas Heater heat exchanger.

In examples, the fuel can comprise natural gas or liquid fuel (such as fuel oil). In additional examples, the fuel can be comprised of hydrogen or a mix of gases. The fuel can originate from a fuel source such as a pipeline or storage tank, such as fuel source 60 (FIG. 1) or fuel source 140 (FIG. 3).

In examples, the first stage heat transfer medium can comprise a fluid from a steam cycle or bottoming cycle. In a particular example, the first heat transfer medium can comprise water from the intermediate stage of a HRSG. In examples, the first heat transfer medium can comprise feedwater extracted from intermediate pressure section 46 at 1' (FIG. 1). In additional examples, the first stage heat transfer medium can comprise water from another source, such as an industrial process.

In examples, the second stage heat transfer medium can comprise compressed air extracted from a compressor of a gas turbine engine used in a combined cycle power plant. In a particular example, the compressed air can be extracted from the discharge of the compressor. In examples, the second stage heat transfer medium can be extracted from compressor 50 as shown in FIG. 1. In additional examples, the second stage heat transfer medium can comprise air from another source, such as an industrial process or exhaust gas of a turbine.

Combined heat exchanger 82 and first stage heat exchanger 84 can comprise any type of heat exchanger suitable for transferring heat from the first heat transfer medium and the second heat transfer medium to the fuel.

In examples, first stage heat exchanger 84 can comprise a shell and tube heat exchanger, a double tube or pipe heat exchanger, a plate heat exchanger, and a tube in tube heat exchanger. In examples, first stage heat exchanger 84 can comprise a concurrent flow heat exchanger, a countercurrent flow heat exchanger, a cross flow heat exchanger, and a cross/counter flow or hybrid heat exchanger. As illustrated in FIG. 3, first stage heat exchanger 106 can comprise a concurrent flow, hybrid shell and tube heat exchanger.

In examples, combined heat exchanger 82 can comprise a shell and tube heat exchanger, a double tube or pipe heat exchanger, a plate heat exchanger, and a tube in tube heat exchanger. In examples, combined heat exchanger 82 can comprise a concurrent flow heat exchanger, a countercurrent flow heat exchanger, a cross flow heat exchanger, and a cross/counter flow or hybrid heat exchanger. In additional examples, combined heat exchanger 130 can comprise a fin-fan heat exchange system. In particular, as illustrated in FIG. 3, combined heat exchanger 130 can comprise a pair of finned tube radiators utilizing air flow to facilitate radiative heat from one radiator to heat the other radiator. Thus, fans 132A and 132B of heat transfer system 130 can be positioned to push (blow) or pull (suck) heat from the finned tube radiator for the second heat transfer medium onto the finned tube radiator for the fuel. In additional examples, one or more than two fans can be used.

In an example, fuel can enter first stage heat exchanger 84 at approximately fifteen degrees Celsius (~59° Fahrenheit) and can leave first stage heat exchanger 84 at approximately two-hundred-twenty degrees Celsius (~432° Fahrenheit). In an example, fuel can enter combined heat exchanger 82 at approximately two-hundred-twenty degrees Celsius (~432° Fahrenheit) and can leave combined heat exchanger 82 at approximately three-hundred-ten degrees Celsius (~590° Fahrenheit). In additional examples, fuel can leave combined heat exchanger 82 at approximately three-hundred-fifty degrees Celsius (~662° Fahrenheit) or higher. In examples, compressed air can leave the compressor and enter combined heat exchanger 82 in line 90A at over 800 degrees Celsius (~1472° Fahrenheit) and can leave combined heat exchanger 82 in line 90B lower than 800 degrees Celsius, at temperatures suitable for cooling a combustor (e.g., combustor 52 (FIG. 1)) and a turbine (e.g., turbine 54 (FIG. 1)) from the heat of the combustion process.

Utilizing a bypass system, an example of which is discussed with reference to FIG. 3, the proportion of fuel that flows through both first stage heat exchanger 84 and combined heat exchanger 82 can be modulated to control the fuel temperature. As such, fuel can be routed through one, both or neither of first stage heat exchanger 84 and combined heat exchanger 82. Likewise, heat transfer system 92 can be modulated to control the amount of heat from second stage heat transfer medium transferred to the fuel. Thus, as discussed below, the use of first stage heat exchanger 84 and combined heat exchanger 82 can allow for higher temperature fuel to be provided to a combustor with less reliance on a steam cycle or bottoming cycle for heat and with much less complexity than conventional TCA cooler systems.

FIG. 3 is a schematic diagram illustrating part of a Gas Turbine Combined Cycle (GTCC) power plant 100 comprising combined heat exchanger 102, comprising a turbine cooling air cooler and fuel gas heater, and fuel gas heater 106 of the present disclosure.

GTCC power plant 100 can comprise gas turbine engine 104, fuel gas heater 106 and HRSG 108. Gas turbine engine 104 can comprise compressor 110, combustor 112 and turbine 114. HRSG 108 can comprise intermediate pressure (IP) drum 116, economizer 118 and pump 120. Fuel gas heater 106 can comprise shell 122 and tube 124. Heat exchanger 102 can comprise first radiator 126, second radiator 128 and heat transfer system 130, which can comprise first fan 132A and second fan 132B.

Fuel from fuel source 140 can be directed to fuel gas heater 106 through line 150. Fuel from fuel gas heater 106 can be directed to radiator 128 of heat exchanger 102 through line 152. Fuel from radiator 128 can be directed to combustor 112 through line 154.

Compressed air can be extracted from compressor 110 at line 156 and provided to radiator 126. Compressed air can be directed from radiator 126 to gas turbine engine 104 through line 158. In examples, line 158 can provide cooled compressed air to one or more stages of turbine 114.

Fluid can be extracted from intermediate pressure economizer 118 outlet of HRSG 108 at line 160 and provided to fuel gas heater 106. Fluid can be directed from fuel gas heater 106 to condensate line 142 of HRSG 108 through line 162.

Valves 163A, 163B and 163C can be used to control flow of fuel, feedwater and compressed air through combined heat exchanger 102 and fuel gas heater 106. Valves 163A-163C, fan 132A and fan 132B can be connected to controller 164.

Controller 164 can be configured to operate GTCC power plant 100. Controller 164 is shown being connected to only valve 163C and fan 132B in FIG. 1 for simplicity. However, controller 164 can be configured to operate combined heat exchanger 102, including heat transfer system 130 (including fan 132A and fan 132B), valves 163A-132C, and pump 120. In particular, controller 164 can control fans 132A and 132B and valves 163A-163C to control the temperature of fuel provided to combustor 112.

In the normal operating state, valve 163A can be open, valve 163B can be closed and valve 163C can be closed.

In a normal operating state, valve 163A can be open to allow feedwater from HRSG 108 to enter fuel gas heater 106 through line 160. The feedwater can be taken from HRSG 108 between economizer 118 and IP drum 116. Pump 120 can be used to push feedwater from economizer 118 to IP drum 116 and fuel gas heater 106. Thus, feedwater can move through lines 160 and 162 via pressurization from the operation of HRSG 108 provided by pump 120. In examples, pump 120 can comprise pump 42 of FIG. 1. Economizer 118 can be configured to heat cold water within HRSG 108 to prevent flooding of IP drum 116 with water that is too cold to boil in IP drum 116, based on operating parameters of HRSG 108.

In the illustrated example, fuel from fuel source 140 can flood shell 122. Tube 124 can extend in a serpentine fashion through shell 122 so as to provide a large surface area of tube 124 that can be in contact with the fuel in shell 122. As such, heat from the feedwater in tube 124 can be transferred to the fuel in shell 122.

After passing through fuel gas heater 106 the colder water can be returned to HRSG 108 in line 162. The colder water can be deposited in condensate line 142 where the water will be reused in the steam cycle, such as by being reheated to produce steam to allow for the continuous operation of HRSG 108. In examples, condensate line 142 can connect to the inlet of pump 120.

Valve 163A can be opened and closed by controller 164. In examples, valve 163A can comprise an open/closed valve being either fully open or fully closed. In additional examples, valve 163A can comprise a variable valve wherein differing amounts of feedwater can flow therethrough based upon how much controller 164 commands valve 163A to open. Thus, valve 163A can be modulated to control the water flow through line 160, and thus the temperature of fuel that is exiting fuel gas heater 106.

In the normal operating state, fuel from fuel source 140 can pass in series through fuel gas heater 106 and combined heat exchanger 102. In the illustrated example, fuel gas heater 106 is illustrated as preceding combined heat exchanger 102. However, in other examples, fuel gas heater 106 and combined heat exchanger 102 can be arranged such that fuel passes through combined heat exchanger 102 first, or only through fuel heater 106 or fuel heater 102.

In the normal operating state, compressed air from compressor 110 can be routed to first radiator 126 through line 156 and routed to turbine 114 and combustor 112 through line 158. The compressed air can move under its own power due to being pressurized, however additional compressors can be used. The compressed air can be allowed to freely flow between compressor 110 and turbine 114 and combustor 112. Although not illustrated, lines 156 and 158 can include appropriate valving controllable by controller 164.

In the normal operating state, controller 164 can operate fans 132A and 132B to control the rate of heat transfer between first radiator 126 and second radiator 128. Hot compressor air can flow through a finned tube in first heat exchanger 126 and heat can radiate therefrom. Relatively colder fuel can flow through a finned tube in second heat exchanger 128. Heat from first heat exchanger 126 can be transferred to second heat exchanger 128 via air picking up heat from first heat exchanger 126 and passing over the finned tube of second heat exchanger 128. The size and speed of fans 132A and 132B can be selected to provide a suitable amount of heat transfer for the design of GTCC power plant 100. Thus, in the normal operating state, one or both of fans 132A and 132B can both operate at a given speed for steady state operation. However, as operating parameters of GTCC power plant 100 change, the speed and number of fans 132A and 132B operating can be changed to meet system demands. Fans 132A and 132B can comprise variable speed inverter motors that allow for operation at a wide range of speeds. FIG. 3 illustrates two fans, but one fan or more than two fans can be used.

Furthermore, the proportion of fuel flowing through one or both of fuel gas heater 106 and combined heat exchanger 102 can be controlled via valves 163B and 163C to: A) control the temperature of fuel entering combustor 112 and B) exclude one or both of fuel gas heater 106 and combined heat exchanger 102 from contributing to fuel heating. Although, FIG. 3 illustrates two valves controlling fuel flow, more or fewer can be used.

Valve 163B can be normally closed to allow all of fuel flowing through line 150 to enter fuel gas heater 106. However, valve 163B can be partially opened to allow a portion of the fuel to bypass fuel gas heater 106 and combined heat exchanger 102, thereby lowering the temperature of fuel in line 154 entering combustor 112. In examples, valve 163B can be fully opened and other valves (not illustrated) can be closed to allow all the fuel to bypass fuel gas heater 106 and combined heat exchanger 102.

Valve 163B can be closed and valve 163C can be opened to allow some of fuel from line 152 to bypass combined heat exchanger 102, thereby lowering the temperature of fuel in line 154 downstream of valve 163C. Additionally, another valve can be provided on line 152 downstream of valve 62C that can be closed to completely remove combined heat exchanger 102 from the flow of fuel.

In examples, fuel gas heater 106 can be shut down by closing valve 163A to reduce or eliminate the influence of feedwater on the fuel. Thus, combined heat exchanger 102 can be operated while gas turbine engine 104 is operating in simple cycle and HRSG 108 is not operating. Additionally, in examples, fuel gas heater 106 can be removed from the flow of fuel between fuel source 140 and combustor 112 by including appropriate valving and piping. For example, an additional fuel line can be provided to connect line 150 downstream of valve 163B and line 152 between fuel gas heater 106 and valve 163C. As such, valve 163B can be closed and valve 163C can be modulated to route all or some of fuel through combined heat exchanger 102 with the remainder, if any being provided straight to combustor 112 via valve 163C. Alternatively, fuel from fuel source 140 can be configured to enter combined heat exchanger 102 first and then fuel gas heater 106 and appropriate bypass piping around fuel gas heater 106 can be provided.

Controller 164 can operate as a standalone device or can be connected (e.g., networked) to other machines. In a networked deployment, controller 164 can operate in the capacity of a server machine, a client machine, or both in server-client network environments. In an example, controller 164 can act as a peer machine in peer-to-peer (P2P) (or other distributed) network environment. Controller 164 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine.

Controller 164 can comprise a computer system and can include a hardware processor (e.g., a central processing unit (CPU), a graphics processing unit (GPU), a hardware processor core, or any combination thereof), main memory and static memory, some or all of which may communicate with each other via an interlink, which can comprise a bus. Controller 164 can further include a display unit, an alphanumeric input device (e.g., a keyboard), and a user interface (UI) navigation device (e.g., a mouse). In an example, the display unit, input device and UI navigation device can be a touch screen display. Controller 164 can additionally include a storage device (e.g., drive unit), signal generation device (e.g., a speaker), network interface device, and one or more sensors, such as a global positioning system (GPS) sensor, compass, accelerometer, temperature sensor, pressure sensor or other sensor. Controller 164 can include output controller, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device can include a machine readable medium on which is stored one or more sets of data structures or instructions (e.g., software) embodying or utilized by any one or more of the techniques or functions described herein, such as for operating GTCC power plant 100, including combined heat exchanger 102, valves 163A-163C, heat transfer system 130, pump 120, compressor 138 and combustor 112. The Instructions can also reside, completely or at least partially, within the main memory, within the static memory, or within the hardware processor during execution thereof by controller 164. In examples, one or any combination of the hardware processor, the main memory, the static memory, or the storage device can constitute machine readable media.

The machine readable medium can be a single medium. However, the term "machine readable medium" can include a single medium or multiple media (e.g., a centralized or distributed database, and/or associated caches and servers) configured to store the one or more instructions. The term "machine readable medium" can include any medium that is capable of storing, encoding, or carrying instructions for execution by controller 164 and that cause controller 164 to perform any one or more of the techniques of the present disclosure, or that is capable of storing, encoding or carrying data structures used by or associated with such instructions. Non-limiting machine readable medium examples may include solid-state memories, and optical and magnetic media.

The instructions can further be transmitted or received over the communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device can include one or more physical jacks (e.g., Ethernet, coaxial, or phone jacks) or one or more antennas to connect to a communications network. In an example, the network interface device can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by controller 164, and includes digital or analog communications signals or other intangible medium to facilitate communication of such software.

Figure 4:
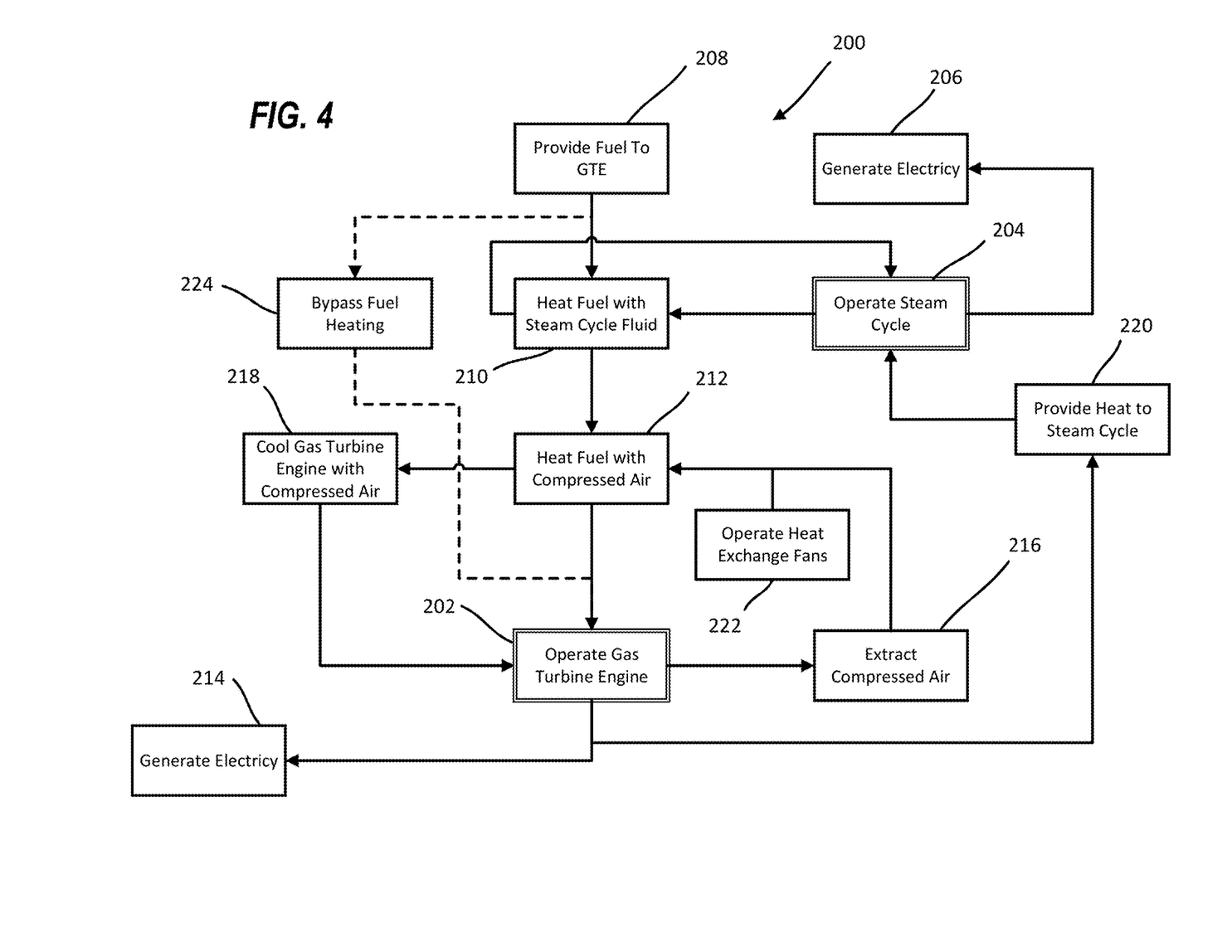
FIG. 4 is a schematic diagram illustrating steps of methods for operating a combined cycle power plant with a combined Turbine Cooling Air cooler and Fuel Gas Heater heat exchanger according to examples of the present disclosure.

FIG. 4 is a line diagram illustrating steps of method 200 for operating GTCC power plant 100 (FIG. 3) with combined heat exchanger 102. Reference numbers discussed with reference to FIG. 4 can be found in FIG. 3. Method 200 can additionally be representative of the operation of other gas turbine combined cycle power plants configured similarly to or different than GTCC power plant 100. Method 200 can comprise simultaneous operation of gas turbine engine 104 and HRSG 108. In additional examples, gas turbine engine 104 and HRSG 108 can be operated alternatively or sequentially in various orders as needed for start-up and shut down, maintenance or partial operation such as due to varying power demand conditions. All or portions of method 200 can be performed by controller 164 (FIG. 3). Instructions for executing all or portions of method 200 can be stored in controller 164 (FIG. 3).

At step 202, gas turbine engine 104 can be operated. Inlet Air A (FIG. 1) and fuel F (FIG. 1) can be provided to combustor 112 to be burned and produce exhaust gas E (FIG. 1). A single gas turbine engine is illustrated in FIG. 3, but more than one of gas turbine engine 104 can be used. In examples, gas turbine engine 104 can comprise one of a bank of gas turbines operating together.

At step 204, a steam cycle including HRSG 108 can be operated. For example, feedwater can be boiled to produce steam used to turn a steam turbine. The feedwater and steam can be processed in low, medium and high stages. In examples, other steam systems, such as boilers, can be used. In examples, step 204 can be omitted or skipped such that the gas turbine engine of step 202 can be operated in simple cycle.

At step 206, the steam turbine of the steam cycle of step 204 can be used to drive an electrical generator to produce electricity. For example, electrical generator 20 (FIG. 1) can be operated via a steam turbine to provide electrical power to a grid system.

At step 208, fuel F can be provided to gas turbine engine 104. In examples, the fuel can comprise 100% natural gas. In examples, the fuel can comprise about 50% to about 70% natural gas, with the balance comprising hydrogen (H2) provided by an external source, such as an electrolyzer. In other examples, the fuel can comprise about 50% to 100% H2. At step 204, controller 164 can coordinate flow of fuel to gas turbine engine 104 through one or both of fuel gas heater 106 and combined heat exchanger 102.

At step 210, the fuel F provided to gas turbine engine 104 can be heated in a first stage heat exchanger. The fuel F can be obtained from an appropriate storage system, such as storage tanks and the like, a pipeline or an electrolyzer. The fuel F can be pumped or otherwise provided to the first stage heat exchanger. The first stage heat exchanger can comprise fuel gas heater 106 of FIG. 3.

At step 212, the fuel F can be heated in a second stage heat exchanger. The fuel F can be provided directly to the second stage heat exchanger from the source or can come from the first stage heat exchanger at step 210. The second stage heat exchanger can comprise combined heat exchanger 102 of FIG. 3.

In examples, steps 210 and 212 can be reversed.

At step 214, the gas turbine engine can be operated to generate electricity. Operation of gas turbine engine 104 can be used to generate rotational shaft power that can be used to drive an electrical generator to generate electricity for providing to a power grid. For example, electrical generator 18 (FIG. 1) can be operated to provide electrical power to a grid system.

At step 216, compressed air can be extracted from the gas turbine engine operating at step 202. In examples, the compressor can comprise compressor 110 of FIG. 3. A portion of the total amount of air compressed by the compressor can be extracted or bled from the gas turbine engine. A majority of the compressed air can be provided to combustor 112 for carrying out a combustion process. The extracted bleed air can be used for other purposes within power plant 100, such as for heating fuel for combustor 112 at step 212. The extracted bleed air can be routed through second stage heat exchanger at step 212. As such, heat from the extracted compressed air can be transferred to the relatively colder fuel.

At step 218, the bleed air that has been extracted from the compressor at step 216 and cooled at step 212 can used to cool gas turbine engine 104. The relatively colder compressed air can be routed back to gas turbine engine 104 to cool combustor 112 and turbine 114. Bleed air from compressor 110 can be extracted for cooling parts of gas turbine engine 104, such as turbine blades, turbine vanes, turbine rotors and combustor panels. The bleed air can be at elevated temperature, but can be relatively colder than temperatures reached within combustor 112 and turbine 114. However, in order to provide better cooling of turbine 114, the bleed air can be cooled before routing into turbine 114.

At step 220, heat from power plant 100 can be provided to the steam cycle of HRSG 108. In examples, the heat can be provided by exhaust gas E of gas turbine engine 104. Exhaust gas E can be used to convert feedwater of HRSG 108 into steam that can be used to rotate a steam turbine. In examples, the steam cycle of step 204 can include steam turbine 16 (FIG. 1), which can be operated via steam produced in HRSG 108.

At step 222, one or more fans can be operated to facilitate heat exchange between the fuel F and the extracted bleed air. For example, controller 164 can operate motors driving fan 132A and fan 132B to control the amount of convection heating between radiator 128 and radiator 126. The speed of the motors can be varied to adjust the air mass flow, and thus, heat transfer rate.

At step 224, some or all of fuel F can be bypassed around one or both of first stage heat exchanger and second stage heat exchanger. For example, a bypass system including piping and valves can be operated to route fuel F to desired locations within GTCC power plant 100.

Steps 222 and 224 can be coordinated by controller 164 to control the temperature of fuel entering combustor 112.

Figure 5:
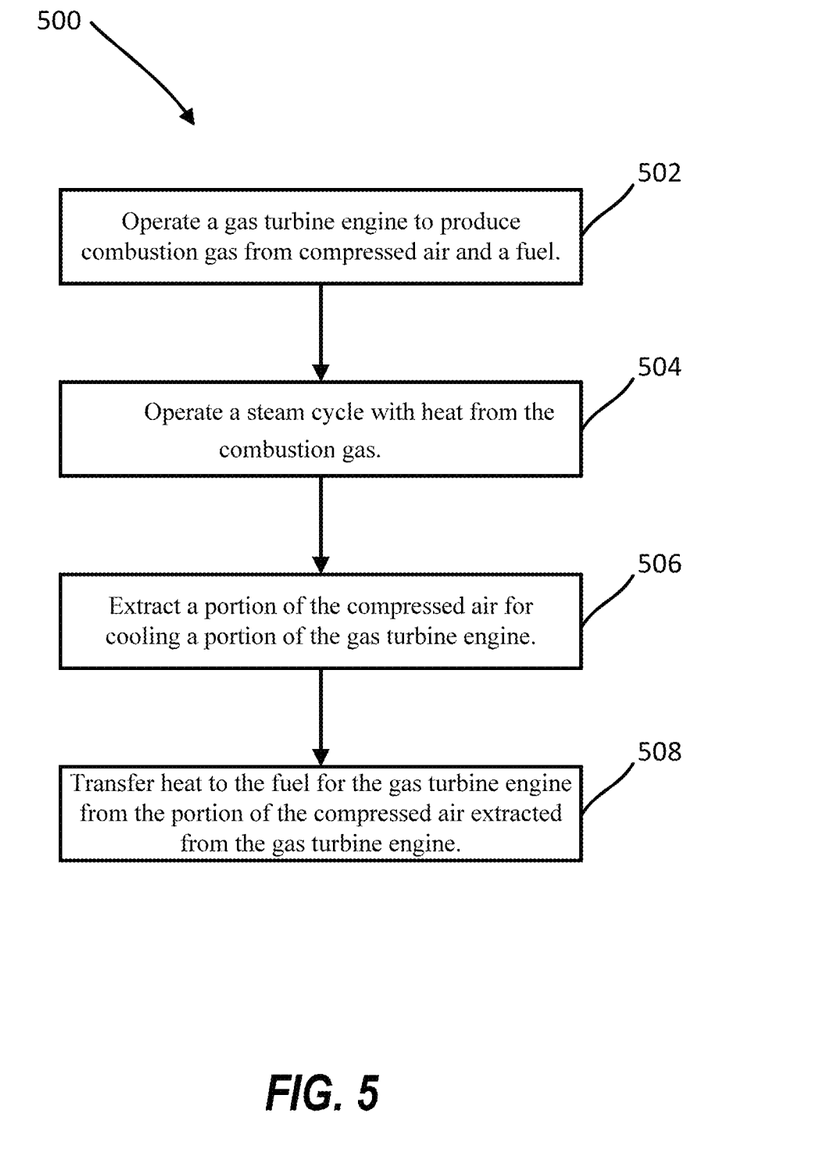
FIG. 5 is a line diagram illustrating a method for heating fuel in a combined cycle power plant.

FIG. 5 is a line diagram illustrating method 500 for heating fuel in a combined cycle power plant.

Step 502 can comprise operating a gas turbine engine, such as gas turbine engine 104 of FIG. 3, to produce combustion gas from compressed air and a fuel.

Step 504 can comprise operating a steam cycle, such as HRSG 108 of FIG. 3, with heat from the combustion gas produced by the gas turbine engine as step 502.

Step 506 can comprise extracting a portion of the compressed air of the gas turbine engine of step 502 to cool a portion of the gas turbine engine.

Step 508 can comprise transferring heat to the fuel for the gas turbine engine from the portion of the compressed air extracted from the gas turbine engine.

In additional examples, method 500 can further comprise extracting water from the steam cycle of step 504 to transfer heat to the fuel for the gas turbine engine in series with the fuel to which heat has been transferred from the portion of the compressed air extracted from the gas turbine engine.

In additional examples, method 500 can further comprise modulating a portion of the fuel being heated by both the portion of the compressed air extracted from the gas turbine engine at step 506 and the water from the steam cycle to control a temperature level of the fuel.

In additional examples, method 500 can further comprise extracting the water from the steam cycle at an intermediate pressure stage of a heat recovery steam generator and returning the water to the heat recovery steam generator after heating the fuel via a condensation line.

In additional examples, method 500 can further comprise passing the fuel through a heat exchanger configured to receive water from the steam cycle when the steam cycle is not operating.

In additional examples, method 500 can further comprise using a fan to transfer heat from the portion of the compressed air extracted from the gas turbine engine to the fuel, extracting heat from the portion of the compressed air extracted from the gas turbine engine in a first fin and tube radiator and absorbing at least some of the heat extracted from the first fin and tube radiator in the fuel within a second fin and tube radiator.

The integration of combined heat exchanger 102 into Gas Turbine Combined Cycle (GTCC) power plant 100 can have numerous advantages, some of which are enumerated below.

1) Integration of combined heat exchanger 102 can reduce capital equipment costs due to, for example, the elimination of a feedwater TCA cooler, such as TCA cooler 34 of FIG. 1, and the valving and piping associated with implementing such a feedwater-based TCA cooler. Additionally, the size and capacity of fuel gas heater 106 can be reduced compared to FGH 30 of FIG. 1.

2) Combined heat exchanger 102 can achieve the same or similar heat rate as conventional feedwater-based TCA coolers, particularly those configured to heat the fuel to 310° C.

3) Use of the combined heat exchanger 102 can have a lower impact, e.g., extract less heat from, to the bottoming cycle. For example, only water from intermediate pressure section 46 (FIG. 1) can be used in fuel gas heater 106 followed by further heating in combined heat exchanger 102, or vice versa. In other examples, the impact to the bottoming cycle can be further lowered by heating the fuel with combined heat exchanger 102 first and then heating with fuel gas heater 106.

4) GTCC power plant 100 with combined heat exchanger 102 can be operated in simple cycle mode with combined heat exchanger 102 because, for example, feedwater is not required to heat the fuel. This can allow for more flexibility in the operation of GTCC power plant 100.

5) GTCC power plant 100 with combined heat exchanger 102 can be operated at lower part load and in turndown operations without impact to bottoming cycle, e.g., the performance of HRSG 14 because, for example, operation of combined heat exchanger 82 is independent of feedwater from the bottoming cycle. In general, it is better to connect into the bottoming cycle at the IP stage or even the LP stage to reduce the impact on the performance of the bottoming cycle. Because combined heat exchanger 102 does not integrated with the bottoming cycle, heat transfer system 130 can be modulated independently from what is happening in the bottoming cycle. In conventional systems, similar to those of FIG. 1, operation of the bottoming cycle and the gas turbine engine are tied together such that if the feedwater circuit is changed to obtain certain turndown conditions for the gas turbine engine, the entire bottoming cycle is affected. Having combined heat exchanger 102 not relying on the bottoming cycle and fuel gas heater 106 optionally relying on the bottoming cycle, provides flexibility to the operating states of GTCC power plant 100.

6) The use of hot air in addition to hot water to heat the fuel can allow for heating to higher temperatures than just using water alone. For example, heating with only water can heat to about 365 to 370 degrees Celsius because of thermodynamic (two phase flow in FGH heat exchanger), HRSG and ST construction limitations. However, adding the use of hot air from compressor 110, which can be approximately 800 degrees Celsius, can allow for heating of the fuel above 400 degrees Celsius.

7) In additional examples of GTCC power plant 100, air from various sources can be used to heat fuel instead of or in combination with compressor air. For example, hot air from exhaust gas exiting the gas turbine engine or the HRSG could be used. Additionally, hot air from an external source, such as an industrial process, can be used. These additional sources of hot air can further decouple the fuel gas heating system from the operation of the bottoming cycle and even the gas turbine engine.

VARIOUS NOTES & EXAMPLES

Example 1 is a combined cycle power plant comprising: a gas turbine engine comprising: a compressor configured to produce compressed gas; a combustor configured to produce combustion gas from the compressed gas and a fuel; and a turbine configured to receive the combustion gas to produce rotational shaft power; a steam system configured to generate steam from water using the combustion gas exiting the turbine; a first stage fuel-gas heater configured to receive the fuel before entering the combustor and receive feedwater from the steam system to transfer heat from the feedwater to the fuel; and a second stage fuel-gas heater configured to receive at least a portion of the fuel from the first stage fuel-gas heater to transfer heat to the fuel from a heat transfer medium before the fuel enters the combustor.

In Example 2, the subject matter of Example 1 optionally includes feedwater that is drawn from an intermediate pressure stage of a heat recovery steam generator of the steam system and returned to a condensate line of the heat recovery steam generator.

In Example 3, the subject matter of any one or more of Examples 1-2 optionally includes the heat transfer medium comprising bleed air from the compressor sent to the second stage fuel-gas heater, the bleed air to be routed to the turbine as cooling air after transferring heat to the fuel.

In Example 4, the subject matter of Example 3 optionally includes the fuel and the bleed air being fluidly isolated in the second stage fuel-gas heater.

In Example 5, the subject matter of Example 4 optionally includes the second stage fuel-gas heater comprising a fin-fan heat exchanger.

In Example 6, the subject matter of Example 5 optionally includes the fin-fan heat exchanger comprising at least one fan to direct airflow across the fin-fan heat exchanger to transfer heat from the bleed air to the fuel.

In Example 7, the subject matter of any one or more of Examples 1-6 optionally includes a bypass system to selectively control a proportion of the fuel that flows through the first stage fuel-gas heater and the second stage fuel-gas heater.

In Example 8, the subject matter of Example 7 optionally includes a fin-fan heat exchanger in the second stage fuel-gas heater, the fin-fan heat exchanger having at least one fan and a controller configured to operate the bypass system and the at least one fan to control temperature of the fuel entering the combustor.

Example 9 is a combined cycle power plant comprising: a gas turbine engine configured to generate combustion exhaust from compressed air and fuel; a steam cycle configured to generate steam using heat from the combustion exhaust; and an air fuel heater configured to heat fuel for the gas turbine engine with an air source; and a controller configured to: operate the air fuel heater to control a temperature level of the fuel provided to the gas turbine engine by the air fuel heater.

In Example 10, the subject matter of Example 9 optionally includes a water fuel heater configured to heat fuel for the gas turbine engine with a water source; wherein the water fuel heater and the air fuel heater heat the fuel in series.

In Example 11, the subject matter of Example 10 optionally includes the water fuel heater heating the portion of fuel before the air fuel heater.

In Example 12, the subject matter of any one or more of Examples 10-11 optionally includes the controller being configured selectively bypass fuel flow around the water fuel heater to heat the fuel with only the air fuel heater.

In Example 13, the subject matter of any one or more of Examples 10-12 optionally includes the water source comprising feed water for the steam cycle; and the air source comprising compressed air form the gas turbine engine.

In Example 14, the subject matter of any one or more of Examples 10-13 optionally includes the air fuel heater comprising: a first radiator configured to receive the air source; a second radiator configured to receive the fuel; and a fan to direct heat emitted from the first radiator into the second radiator.

Example 15 is a method of heating fuel in a combined-cycle power plant, the method comprising: operating a gas turbine engine to produce combustion gas from compressed air and a fuel; operating a steam cycle with heat from the combustion gas; extracting a portion of the compressed air for cooling a portion of the gas turbine engine; and transferring heat to the fuel for the gas turbine engine from the portion of the compressed air extracted from the gas turbine engine.

In Example 16, the subject matter of Example 15 optionally includes extracting water from the steam cycle to transfer heat to the fuel for the gas turbine engine in series with the fuel to which heat has been transferred from the portion of the compressed air extracted from the gas turbine engine.

In Example 17, the subject matter of Example 16 optionally includes modulating a portion of the fuel being heated by both the portion of the compressed air extracted from the gas turbine engine and the water from the steam cycle to control a temperature level of the fuel.

In Example 18, the subject matter of any one or more of Examples 16-17 optionally includes extracting the water from the steam cycle at an intermediate pressure stage of a heat recovery steam generator; and returning the water to the heat recovery steam generator after heating the fuel via a condensation line.

In Example 19, the subject matter of any one or more of Examples 15-18 optionally includes passing the fuel through a heat exchanger configured to receive water from the steam cycle when the steam cycle is not operating.

In Example 20, the subject matter of any one or more of Examples 15-19 optionally includes using a fan to transfer heat from the portion of the compressed air extracted from the gas turbine engine to the fuel; extracting heat from the portion of the compressed air extracted from the gas turbine engine in a first fin and tube radiator; and absorbing at least some of the heat extracted from the first fin and tube radiator in the fuel within a second fin and tube radiator.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A combined cycle power plant comprising:
    a gas turbine engine comprising:
        a compressor configured to produce compressed gas;
        a combustor configured to produce combustion gas from the compressed gas and a fuel; and
        a turbine configured to receive the combustion gas to produce rotational shaft power;
    a steam system configured to generate steam from water using the combustion gas exiting the turbine;
    a first stage fuel-gas heater configured to receive the fuel before entering the combustor and receive feedwater from the steam system to transfer heat from the feedwater to the fuel;
    a second stage fuel-gas heater configured to receive at least a portion of the fuel from the first stage fuel-gas heater to transfer heat to the fuel from a heat transfer medium before the fuel enters the combustor, wherein the heat transfer medium comprises compressed air from the compressor of the gas turbine engine;
    a bypass system to selectively control a proportion of the fuel that flows through each of the first stage fuel-gas heater and the second stage fuel-gas heater;
    a fin-fan heat exchanger in the second stage fuel-gas heater, the fin-fan heat exchanger having a first fan; and
    a controller configured to operate the bypass system and the first fan to control temperature of the fuel entering the combustor, wherein the controller is configured to modulate the bypass system and the first fan to heat the fuel with partial heat input from the first stage fuel-gas heater;
    wherein the controller is further configured to:
        heat the fuel with water below a critical temperature of water in the first stage fuel-gas heater;
        heat the fuel with compressed air to temperatures above the critical temperature of water in the second stage fuel-gas heater;
        control an amount of compressed air extracted from the compressor to provide a heat input to the second stage fuel-gas heater based on operating needs of the gas turbine engine for compressed air; and
        operate the first fan of the second stage fuel-gas heater to control an amount of heat from the compressed air transferred to the fuel based on operating needs of the gas turbine engine for fuel;
    wherein the critical temperature of water corresponds to temperatures where water changes phase from liquid to gas.

2. The combined cycle power plant of claim 1, wherein the feedwater is drawn from an intermediate pressure stage of a heat recovery steam generator of the steam system and returned to a condensate line of the heat recovery steam generator.

3. The combined cycle power plant of claim 1, wherein:
    the compressed air comprises bleed air from the compressor, the bleed air configured to be routed to the turbine as cooling air after transferring heat to the fuel; and
    the fuel comprises gaseous fuel.

4. The combined cycle power plant of claim 3, wherein the fuel and the bleed air are fluidly isolated in the second stage fuel-gas heater.

5. The combined cycle power plant of claim 4, wherein the second stage fuel-gas heater comprises the fin-fan heat exchanger, wherein the fin-fan heat exchanger comprises the first fan to direct airflow across the fin-fan heat exchanger to transfer heat from the bleed air to the fuel.

6. The combined cycle power plant of claim 1, wherein the bypass system comprises:
a first valve to selectively shut-off flow of feedwater through the first stage fuel-gas heater, the first valve being controllable by the controller;
a second valve operable to bypass fuel flow through both the first stage fuel-gas heater an the second-stage fuel gas heater to allow direct fuel flow from a fuel source to the combustor; and
a third valve operable to bypass fuel flow through the second stage fuel-gas heater to allow direct fuel flow from the first stage fuel-gas heater to the combustor;
wherein the controller is configured to operate the second valve and the third valve to control temperature of the fuel;
wherein the controller is configured selectively bypass all fuel flow around the first stage fuel-gas heater to heat the fuel with only the second stage fuel-gas heater while the gas turbine engine is operating in simple cycle without the steam system.

7. The combined cycle power plant of claim 1, wherein the first stage fuel-gas heater heats the portion of fuel to temperatures below 375° Celsius before the second stage fuel-gas heater.

8. The combined cycle power plant of claim 1, wherein the second stage fuel-gas heater comprises:
a first radiator configured to receive the compressed air;
a second radiator configured to receive the fuel; and
a second fan to direct heat emitted from the first radiator into the second radiator.

9. The combined cycle power plant of claim 1, wherein the controller is configured selectively bypass all fuel flow around the first stage fuel-gas heater to heat the fuel with only the second stage fuel-gas heater while the gas turbine engine is operating in simple cycle without the steam system.

10. The combined cycle power plant of claim 1, wherein the controller is configured to operate the first stage fuel-gas heater, the second stage fuel-gas heater and the bypass system to:
cause fuel to enter the first stage fuel-gas heater at approximately fifteen degrees Celsius and leave the first stage fuel-gas heater at approximately two-hundred degrees Celsius; and
cause fuel to enter the second stage fuel-gas heater at approximately two-hundred degrees Celsius and leave the second stage fuel-gas heater in the range of approximately three-hundred-ten degrees Celsius to approximately three-hundred-fifty degrees Celsius.

11. The combined cycle power plant of claim 10, wherein the second stage fuel-gas heater is configured to receive compressed air from the compressor at approximately eight-hundred degrees Celsius.

12. A method of heating fuel in a combined-cycle power plant, the method comprising:
operating a gas turbine engine to produce combustion gas from compressed air and a fuel, the gas turbine engine comprising a compressor, a combustor and a turbine;
operating a steam cycle with heat from the combustion gas;
extracting water from the steam cycle to transfer heat to the fuel for the gas turbine engine in a first stage fuel-gas heater;
extracting a portion of the compressed air for cooling a portion of the gas turbine engine;
transferring heat to the fuel for the gas turbine engine from the portion of the compressed air extracted from the gas turbine engine in a second stage fuel-gas heater in series with the first stage fuel-gas heater, the second stage fuel-gas heater comprising a fin heat exchanger;
heat the fuel with the water extracted from the steam cycle below a critical temperature of water in the first stage fuel-gas heater, wherein the critical temperature comprises temperatures where water changes phase from liquid to gas;
heat the fuel with compressed air extracted from gas turbine engine to temperatures above the critical temperature of water in the second stage fuel-gas heater;
selectively bypassing the first stage fuel-gas heater with a portion of the fuel to modulate a proportion of the fuel that flow through each of the first stage fuel-gas heater and the second stage fuel-gas heater;
using a fan to transfer heat from the portion of the compressed air extracted from the gas turbine engine to the fuel;
controlling an amount of compressed air extracted from the compressor to provide a heat input to the second stage fuel-gas heater based on operating needs of the gas turbine engine for compressed air; and
operating the first fan of the second stage fuel-gas heater to control an amount of heat from the compressed air transferred to the fuel based on operating needs of the gas turbine engine for fuel.

13. The method of claim 12, further comprising modulating a portion of the fuel being heated by both the portion of the compressed air extracted from the gas turbine engine and the water from the steam cycle and modulating the fan to control a temperature level of the fuel.

14. The method of claim 12, further comprising:
extracting the water from the steam cycle at an intermediate pressure stage of a heat recovery steam generator; and
returning the water to the heat recovery steam generator after heating the fuel via a condensation line.

15. The method of claim 12, further comprising passing the fuel through the second stage fuel-gas heater when the steam cycle is not operating.

16. The method of claim 12, further comprising:
extracting heat from the portion of the compressed air extracted from the gas turbine engine in a first fin and tube radiator; and
absorbing at least some of the heat extracted from the first fin and tube radiator in the fuel within a second fin and tube radiator.

* * * * *